United States Patent
Polley et al.

(10) Patent No.: US 8,896,950 B1
(45) Date of Patent: Nov. 25, 2014

(54) ANALOG FRONT END FOR PROXIMITY SENSING OF TUNNELING CURRENT

(71) Applicant: Texas Instruments Incorporated, Dallas, TX (US)

(72) Inventors: Arup Polley, Richardson, TX (US); Pankaj Pandey, McKinney, TX (US); Bryan Bloodworth, Coppell, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/295,113

(22) Filed: Jun. 3, 2014

Related U.S. Application Data

(60) Provisional application No. 61/834,339, filed on Jun. 12, 2013.

(51) Int. Cl.
*G11B 5/09* (2006.01)
*G11B 21/02* (2006.01)
*G11B 5/60* (2006.01)

(52) U.S. Cl.
CPC ............... *G11B 5/09* (2013.01); *G11B 5/6011* (2013.01)
USPC ................................... 360/46; 360/75; 360/67

(58) Field of Classification Search
None
See application file for complete search history.

(56) References Cited

U.S. PATENT DOCUMENTS

| | | | |
|---|---|---|---|
| 2,419,812 A * | 4/1947 | Bedford | 318/619 |
| 6,092,412 A * | 7/2000 | Flechsig et al. | 73/105 |
| 6,347,018 B1 * | 2/2002 | Kadlec et al. | 360/77.08 |
| 6,671,110 B2 * | 12/2003 | Baba et al. | 360/75 |
| 7,365,665 B2 * | 4/2008 | Pease | 341/139 |
| 7,580,759 B2 | 8/2009 | Marchon et al. | |
| 7,626,777 B2 * | 12/2009 | Aemireddy et al. | 360/67 |
| 8,254,048 B2 * | 8/2012 | Dahle et al. | 360/46 |
| 8,710,904 B2 | 4/2014 | Polley | |
| 8,760,790 B2 * | 6/2014 | Natzke et al. | 360/67 |

* cited by examiner

*Primary Examiner* — Thang Tran
(74) *Attorney, Agent, or Firm* — Alan A. R. Cooper; Frederick J. Telecky, Jr.

(57) ABSTRACT

A circuit includes an input that receives a current that increases as a tunneling current sensor moves closer to a media. A high gain path is operatively coupled to the input to amplify the received current as a first amplified output. The first amplified output increases until a saturation threshold is attained for the high gain path. Further increases in the received current beyond the saturation threshold are diverted from the input as an overflow current. A low gain path is operatively coupled to the input to amplify the overflow current as a second amplified output. The second amplified output increases with the overflow current as the tunneling current sensor continues to move closer to the media.

20 Claims, 7 Drawing Sheets

ANALOG FRONT END FOR PROXIMITY SENSING OF TUNNELING CURRENT

CROSS-REFERENCE TO RELATED APPLICATION

This application claims the benefit of U.S. Provisional Patent Application 61/834,339 filed on Jun. 12, 2013, and entitled ANALOG FRONT END FOR PROXIMITY SENSING USING TUNNELING/TRIBO CURRENT.

TECHNICAL FIELD

This disclosure relates to disk drive control systems, and more particularly to an analog front end circuit that employs high and low gain paths to sense large dynamic range currents for a disk drive control system.

BACKGROUND

Magnetic hard disk drive systems typically include a magnetic disk, a recording head having write and read elements, a suspension arm, and an actuator arm. As the magnetic recording media is rotated, air adjacent to the disk surface moves with the disk. This allows the recording head (also referred to as a slider) to fly on an extremely thin cushion of air, generally referred to as an air bearing. When the recording head flies on the air bearing, the actuator arm swings the suspension arm to place the recording head over selected circular tracks on the rotating magnetic recording media where signal fields are written to and read by the write and read elements, respectively. The write and read elements are connected to processing circuitry that operates according to a computer program to implement write and read functions.

Recording head flying height is one of the key elements of the density of magnetic recording drives. The closer a recording head flies above the magnetic recording media, the higher density recording that can be utilized. In order to meet the increasing aerial density requirements, hard-disk drive (HDD) manufactures are seeking methods to control the fly height of read/write heads relative to the disk surface during normal operation. Such methods can dramatically improve the Bit Error Rate (BER) and drive density which are considered critical parameters in HDD systems. A closed loop and accurate control of the fly height requires an accurate estimate of the fly height.

SUMMARY

This disclosure relates to an analog front end circuit that employs high and low gain paths to sense large dynamic range currents for a disk drive control system. In one aspect, a circuit includes an input that receives a current that increases as a tunneling current sensor moves closer to a media. A high gain path is operatively coupled to the input to amplify the received current as a first amplified output. The first amplified output increases until a saturation threshold is attained for the high gain path. Further increases in the received current beyond the saturation threshold are diverted from the input as an overflow current. A low gain path is operatively coupled to the input to amplify the overflow current as a second amplified output. The second amplified output increases with the overflow current as the tunneling current sensor continues to move closer to the media.

In another aspect, a circuit includes an input that receives a current that increases as a tunneling current sensor approaches a media. A first amplifier is operatively coupled to the input to convert the received current as a first voltage output. The first voltage output increases with increases in the received current until a saturation threshold is attained for the first amplifier. Further increases in the received current beyond the saturation threshold are diverted from the input as an overflow current. A second amplifier is operatively coupled to the input to convert the overflow current as a second voltage output if an overthrow threshold for the second amplifier is attained. The second voltage output increases with increases in the overflow current as the tunneling current sensor continues to approach the media. A combiner merges the first voltage output of the first amplifier and the second voltage output of the second amplifier into a control voltage that is employed to control the fly height of a disk head that reads or writes to the media.

In yet another aspect, an input receives a current that increases as a tunneling current sensor approaches a media. A high gain path is operatively coupled to the input to convert the received current as a first voltage output. The first voltage output increases with increases in the received current until a saturation threshold is attained for the high gain path. Further increases in the received current beyond the saturation threshold are diverted from the input as an overflow current. A low gain path is operatively coupled to the input to convert the overflow current as a second voltage output if an overthrow threshold for the low gain path is attained. The second voltage output increases with increases in the overflow current as the tunneling current sensor continues to approach the media. A combiner merges the first voltage output of the high gain path and the second voltage output of the low gain path into a control voltage that is employed to control the fly height of a disk head that reads or writes to the media. A controller receives the control voltage from the combiner to control the fly height of a head that reads or writes to the media.

DETAILED DESCRIPTION

This disclosure relates to a circuit that employs high and low gain paths to sense large dynamic range currents for a disk drive control system. In order to increase the density of magnetic storage media, the height of the read/write head (also referred to as a slider) of the disk drive should be controlled to be within close proximity of the media. This height is referred to as fly height and is the distance the sensing elements of the head are located with respect to the media. In order to accurately determine the fly height, a tunneling current sensor can be employed with the head to provide an increasing amount of current to an input as the tunneling current sensor approaches the media. At greater distance from the media, the tunneling current sensor can sense currents to a few picoamperes, for example. As the head and sensor approaches the media, currents from the tunneling current sensor can increase dramatically (e.g., up to 100's of nanoamperes) thus there is large dynamic range of currents to be accounted for as the fly height changes.

A high gain path can be employed to amplify the received current from the tunneling current sensor and provide a first amplified output. The high gain path is operative when sensed current is small and the head is at a greater distance from the media. The first amplified output of the high gain path increases with the received current as the tunneling current sensor approaches the media until a saturation threshold is attained for the high gain path. Further increases in the received current are diverted from the input as an overflow current. As the head moves ever closer to the media, a low gain path becomes operative to amplify the overflow current to a second amplified output. The second amplified output increases with the overflow current as the tunneling current sensor approaches the media and an overflow threshold for the low gain path is attained. Output from the high gain path and the low gain path can be combined (e.g., via a controller or analog combiner) into a control voltage (or digital value representing combined voltage) that is employed to control the fly height of a head that reads or writes to the media. By utilizing successive stages to process overflow from a previous amplification stage as the tunneling current sensor approaches the media, large dynamic range currents can be detected and combined across stages without distortion and utilized to control the fly height of the disk drive.

Figure 1:
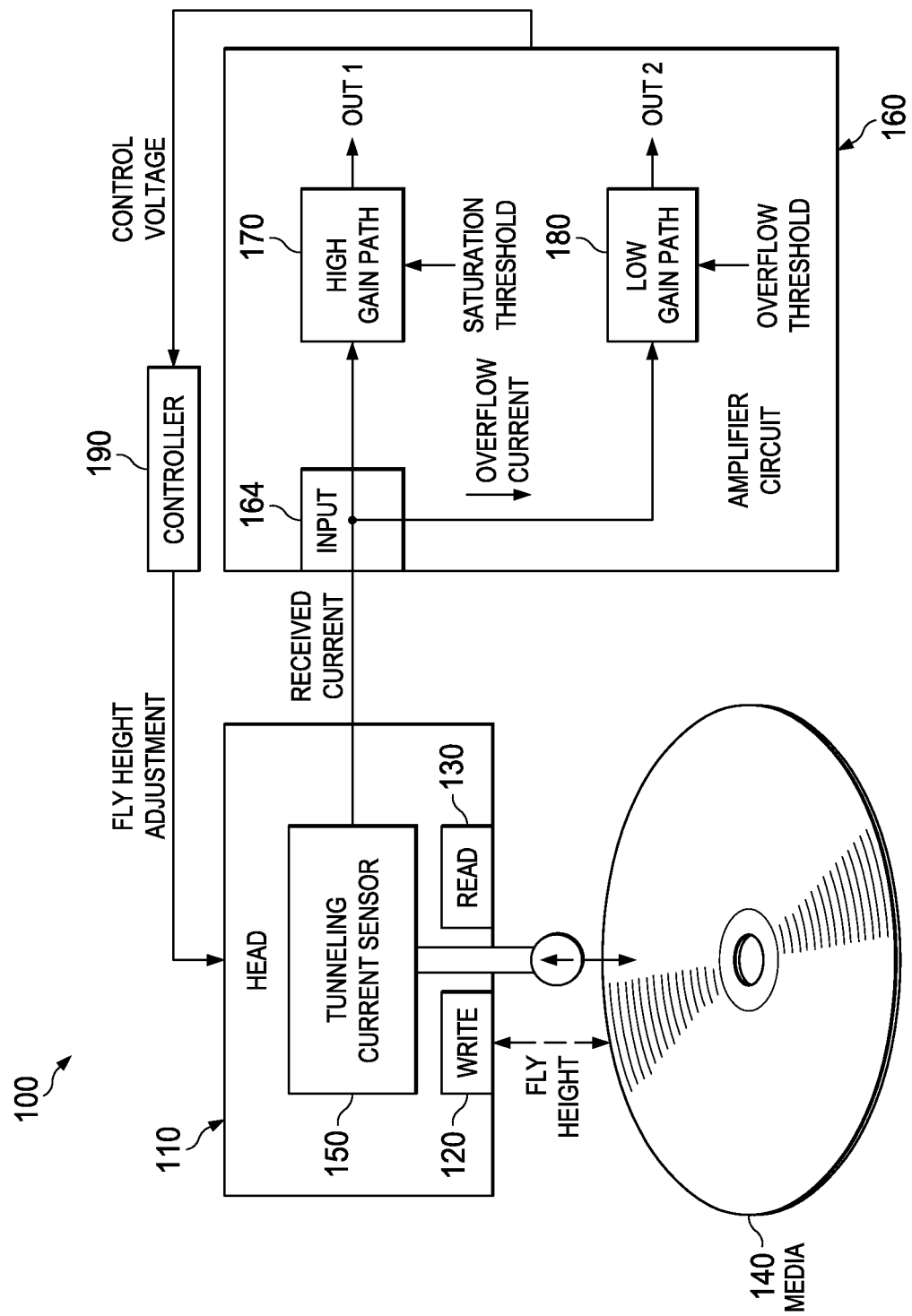
FIG. 1 illustrates an example of schematic block diagram of a system that employs high and low gain paths to sense large dynamic range currents for a disk drive control system.

FIG. 1 illustrates an example of a system 100 that employs high and low gain paths to sense large dynamic range currents for a disk drive control system. As used herein, the term circuit can include a collection of active and/or passive elements that perform a circuit function such as an amplifier or voltage converter. The term circuit can also include an integrated circuit where all the circuit elements are fabricated on a common substrate, for example. The system 100 includes a head 110 which can also be referred to as a slider. The head 110 includes write and/or read components 120 and 130, respectively, to write data to or read data from a media 140. A tunneling current sensor 150 on the head 110 is employed to detect the fly height of the head which represents a distance that the head is from the media 140. At greater fly height distances, smaller currents are detected (e.g., picoamperes) by the tunneling current sensor 150 and at smaller fly height distances, larger currents are detected (e.g., hundreds of nanoamperes).

An amplifier circuit 160 includes an input 164 to receive a current from the tunneling current sensor 150. The tunneling current sensor 150 provides an increasing amount of current to the input 160 as the tunneling current sensor approaches the media 140. A high gain path 170 coupled to the input 164 amplifies the received current to a first amplified output shown as OUT 1. The first amplified output OUT 1 increases with the received current as the tunneling current sensor 150 approaches the media 140 until a saturation threshold is attained for the high gain path 170. Further increases in the received current are diverted from the input as an overflow current. The saturation threshold for the high gain path 170 can be set by feedback components in the path. For example, the high gain path 170 may include a transimpedance amplifier (TIA) (or amplifiers) having a feedback resistor to convert the received current from the tunneling current sensor 150 into a voltage for further amplification along the path. The saturation threshold can thus be set by the value of the feedback resistor of the TIA (or via other amplifiers in the path), in this example.

A low gain path 180 is coupled to the input 164 to amplify the overflow current to a second amplified output OUT 2. The second amplified output OUT 2 increases with the overflow current as the tunneling current sensor 150 approaches the media 140 and an overflow threshold for the low gain path 180 has been attained. The overflow threshold (e.g., bias threshold for turning on an amplifier) can be set to various values and is employed to activate the low gain path 180 to begin amplifying the overflow current. As used herein, the term amplification can be applied to a current and/or a voltage. Typically, currents received from the tunneling current sensor 150 are converted to voltage via the high gain path 170 and the low gain path 180, respectively, and subsequently amplified as voltages by one or more amplification stages along the respective paths.

The outputs, OUT 1 and OUT 2, can be combined via analog combiners (not shown) in one example to merge OUT 1 of the high gain path 170 and OUT 2 of the low gain path 180 into a control voltage that can be supplied to a controller 190. In another example, the controller 190 can read the separate outputs OUT 1 and OUT 2 as digital values that have been generated in the high gain path 170 and the low gain path 180, respectively, where the controller combines the values to determine the control voltage (or value). The controller 190 receives the control voltage from the circuit 160 to control the fly height (e.g., via motor not shown) of the head 110 that reads or writes data to the media 140. Movement toward the media can continue until the controller 190 senses that control voltage has reached a predetermined voltage threshold (e.g., control voltage correlated with a predetermined fly height).

As noted above, large dynamic range currents can be sensed by the circuit 160 by utilizing successive gain paths to process overflow from a previous amplification path as the tunneling current sensor 150 approaches the media 140. In the examples described herein, two paths including the high gain path 170 and low gain path 180 are shown but more than two paths can also be employed. For example, a first gain path can be employed up to a saturation point for received current, then a second gain path can be employed for overflow currents up to a second saturation point for received current, and subsequent paths can be employed to amplify subsequent overflow currents. By utilizing multiple gain paths having successively lower gains to amplify overflow currents from a previously saturated stage, large dynamic range currents can be detected and combined across paths without distortion and utilized to control the fly height of the head 110.

To provide examples of the saturation threshold and the overflow threshold employed, an example sensing application is described for the tunneling current sensor 150. At a given fly height distance, the tunneling current sensor 150 begins to generate a small current that is typically in the picoamperes. The high gain path 170 amplifies this current received from the tunneling current sensor 150 as a converted voltage signal up to a saturation point for the path. For example, at one hundred picoamperes, the high gain path 170 may saturate with no further increases in the output OUT 1 even as the received current continues to increase.

As the high gain path 170 approaches saturation, the overflow threshold is attained in the low gain path 180 enabling the overflow current from the tunneling current sensor 150 to be amplified (e.g., amplified as a converted voltage). Since the gain is set lower for the low gain path 180 versus the high gain path 170, saturation with respect to the overflow current does not occur in the low gain path. In this specific example, if the high gain path 170 saturates at one hundred picoamperes, and the overflow current is fifty picoamperes, then the combined outputs of OUT 1 and OUT 2 can be one hundred and fifty picoamperes (e.g., voltage proportional to 150 pA or digital value representing 150 pA). Various other received current combinations can be processed by the high gain path 170 and the low gain path 180, respectively. FIGS. 2-7 illustrate examples of an amplification circuit 160 that utilize the high gain path 170 and a low gain path 180 to detect large dynamic range currents supplied by the tunneling current sensor 140 as it approaches the media 140.

Figure 2:
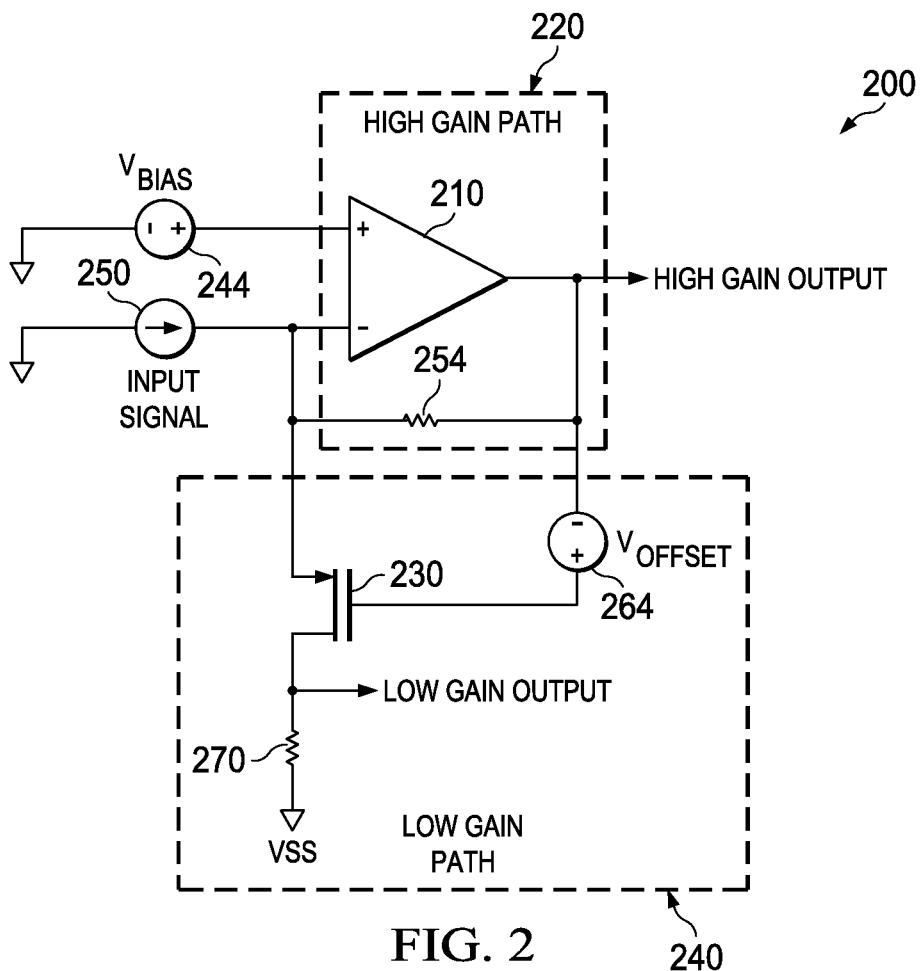
FIG. 2 illustrates an example amplifier circuit that employs a transimpedance amplifier (TIA) for a high gain path and a transistor to amplify overflow currents for a low gain path.

FIG. 2 illustrates an example amplifier circuit 200 that employs a transimpedance amplifier (TIA) 210 for a high gain path 220 and a transistor 230 to amplify overflow currents for a low gain path 240. As shown, the TIA 210 can receive a bias voltage 244 at its positive terminal and receive current input at its negative terminal from a tunneling current sensor represented as current source 250. Feedback resistor 254 sets a saturation threshold for the TIA 210. Overflow current is diverted to transistor 230 when the TIA 210 saturates and an overflow threshold is achieved. The overflow threshold for the low gain path 240 can be set via offset voltage 264 and resistor 270. High gain output from the high gain path 220 and low gain output from low gain path 240 can be combined to form a control voltage for fly height adjustment as will be illustrated and described below. Various other examples for high and low gain paths are illustrated and described below with respect to FIGS. 3-7.

Figure 3:
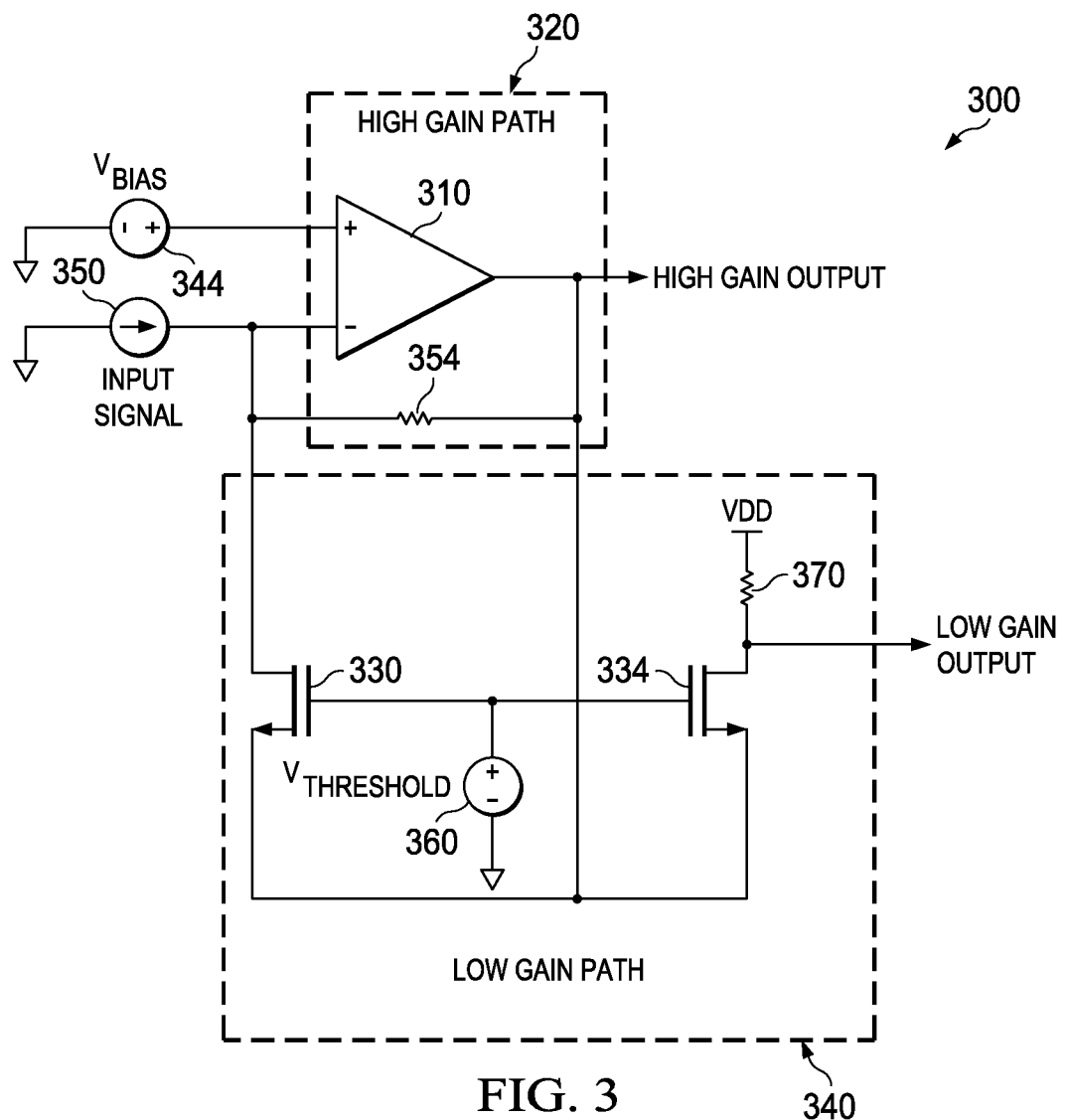
FIG. 3 illustrates an example amplifier circuit that employs a transimpedance amplifier (TIA) for a high gain path and a transistor pair to amplify overflow currents for a low gain path.

FIG. 3 illustrates an example amplifier circuit 300 that employs a transimpedance amplifier (TIA) 310 for a high gain path 320 and a transistor pair 330 and 334 to amplify overflow currents for a low gain path 340. The TIA 310 can receive a bias voltage 344 at its positive terminal and receive current input at its negative terminal from a tunneling current sensor represented as current source 350. Feedback resistor 354 sets a saturation threshold for the TIA 310. Overflow current is diverted to transistor 330 when the TIA 310 saturates and an overflow threshold is achieved. The overflow threshold for the low gain path 340 can be set via threshold voltage 360. Overflow current passed through transistor 330 can be mirrored via transistor 334 to provide the low gain output for the low gain path 340. Pull-up resistor 370 can be employed on for the drain of transistor 334. As noted previously, high gain output from the high gain path 320 and low gain output from low gain path 340 can be combined to form a control voltage for fly height adjustment as will be illustrated and described below.

Figure 4:
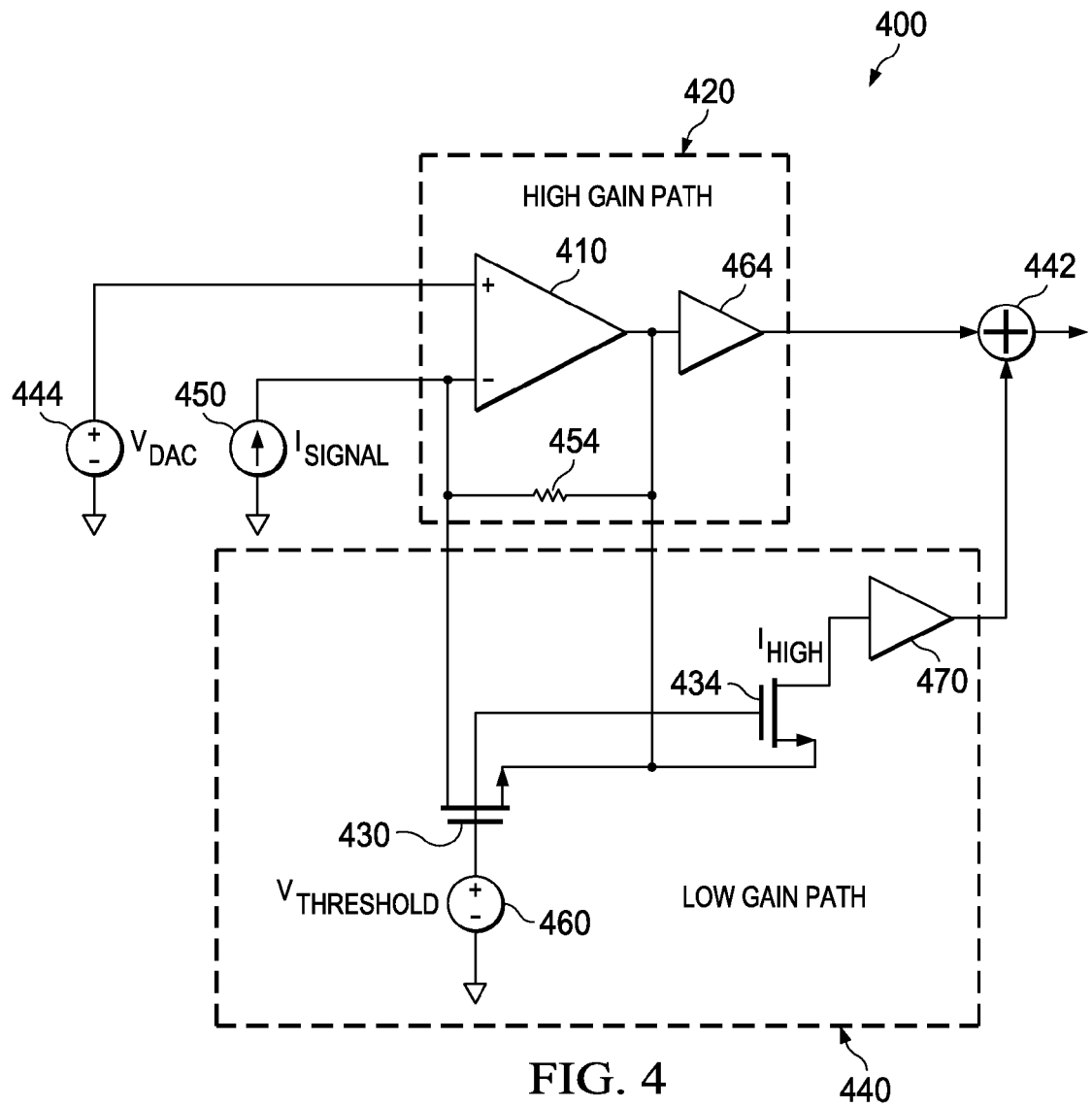
FIG. 4 illustrates an example amplifier circuit that employs a transimpedance amplifier (TIA) for a high gain path and a transistor pair and to amplify overflow currents for a low gain path where outputs from the high and low gain paths are combined via a combiner.

FIG. 4 illustrates an example amplifier circuit 400 that employs a transimpedance amplifier (TIA) 410 for a high gain path 420 and a transistor pair 430 and 434 to amplify overflow currents for a low gain path 440 where outputs from the high and low gain paths are combined via combiner 442. The TIA 410 can receive a bias voltage 444 at its positive terminal (e.g., from digital to analog converter) and receive current input at its negative terminal from a tunneling current sensor represented as current source 450. Feedback resistor 454 sets a saturation threshold for the TIA 410. Overflow current is diverted to transistor 430 when the TIA 410 saturates and an overflow threshold is achieved. The overflow threshold for the low gain path 440 can be set via threshold voltage 460. In this example, output from the TIA 410 is fed to attenuator 464 along the high gain path 420 before being fed to one input of the combiner 442 (e.g., analog summing circuit). Output from transistor 430 in the low gain path can be fed to transistor 434 which drives transimpedance amplifier 470 and feeds a second input to the combiner 442. Output from the combiner 442 can be sent to a control system (not shown) to control the fly height of a disk head.

Figure 5:
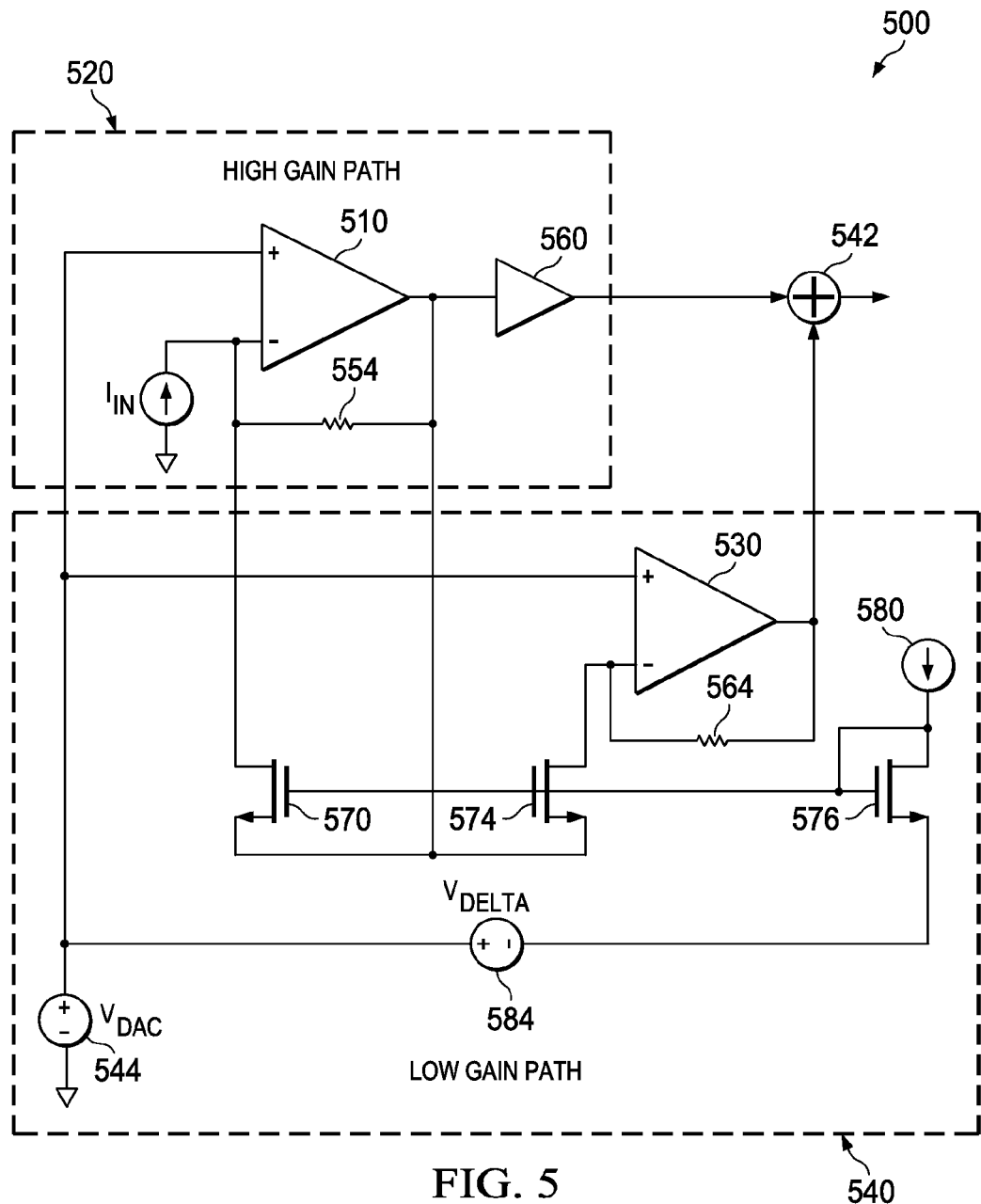
FIG. 5 illustrates an example amplifier circuit that employs a transimpedance amplifier (TIA) for a high gain path and a TIA to amplify overflow currents for a low gain path where outputs from the high and low gain paths are combined via a combiner.

FIG. 5 illustrates an example amplifier circuit 500 that employs a transimpedance amplifier (TIA) 510 for a high gain path 520 and a TIA 530 to amplify overflow currents for a low gain path 540 where outputs from the high and low gain paths are combined via combiner 542. The TIA 510 can receive a bias voltage 544 at its positive terminal (e.g., from digital to analog converter) and receive current input at its negative terminal from a tunneling current sensor represented as current source 550. Feedback resistor 554 sets a saturation threshold for the TIA 510. Output from the TIA 510 is fed to attenuator 560 along the high gain path 520 before being fed to one input of the combiner 542 (e.g., analog summing circuit).

In the low gain path 540, overflow currents are amplified via TIA 530 having its gain set via resistor 564. Output from TIA 530 is combined with high gain path output via combiner 542. A transition threshold can be set for the low gain path 540 via transistors 570, 574, and 574 in conjunction with current source 580 and voltage source 584. Similar to the circuits described above, output from the combiner 542 can be sent to a control system (not shown) to control the fly height of a disk head.

Figure 6:
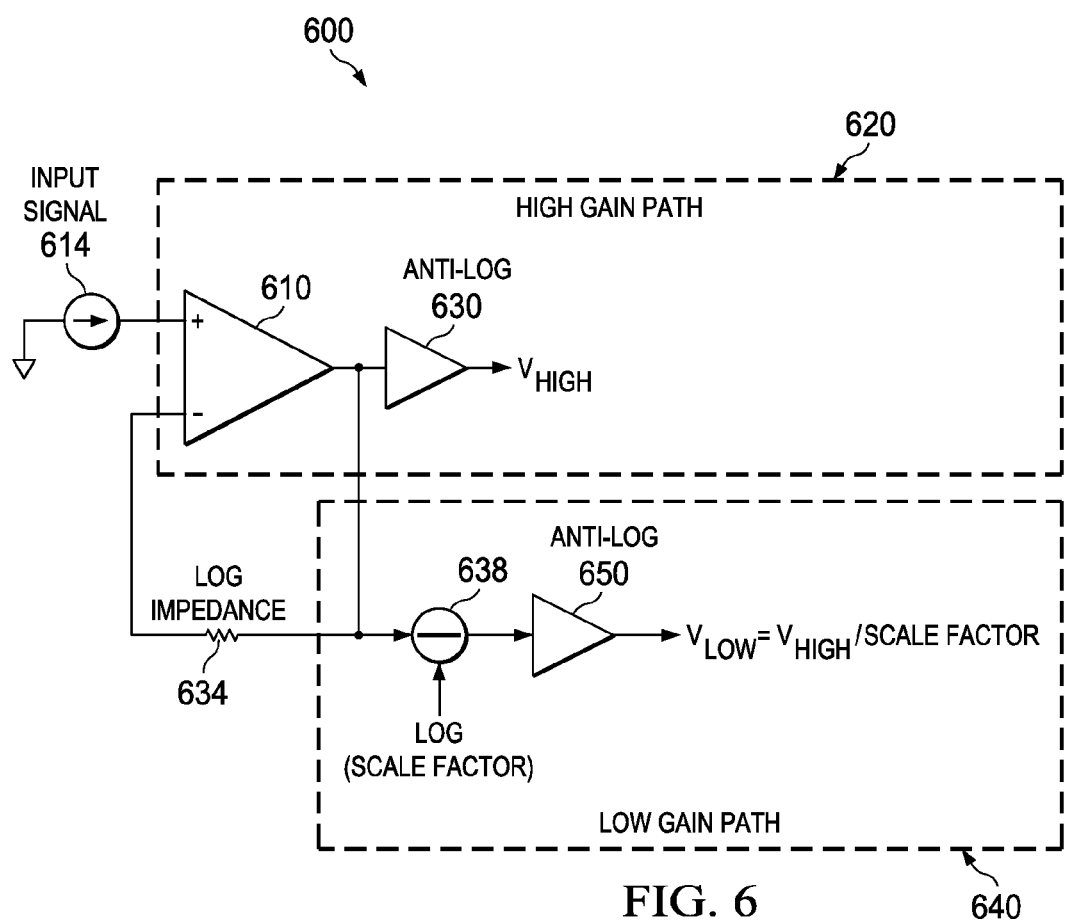
FIG. 6 illustrates an example amplifier circuit that employs logarithmic amplifiers for high and low gain paths to sense large dynamic range currents for a disk drive control system.

FIG. 6 illustrates an example amplifier circuit 600 that employs logarithmic amplifiers for high and low gain paths to sense large dynamic range currents for a disk drive control system. A transimpedance amplifier (TIA) 610 receives current input at its positive terminal from a tunneling current sensor represented as current source 614 in high gain path 620. Output from the TIA 610 can be fed to an antilog amplifier 630 to provide output for the high gain path 620. Gain for the TIA 610 can be set via a log impedance 634. Output from the TIA 610 also drives an input to a subtractor circuit 638 in a low gain path 640. The subtractor 638 de-scales the output from the TIA 610 by subtracting a log scale factor from the TIA output. Output from the subtractor 638 can be fed to an antilog amplifier in the low gain path 640 to provide low gain output. As noted previously, high gain output from the high gain path 620 and low gain output from low gain path 640 can be combined to form a control voltage for fly height adjustment.

Figure 7:
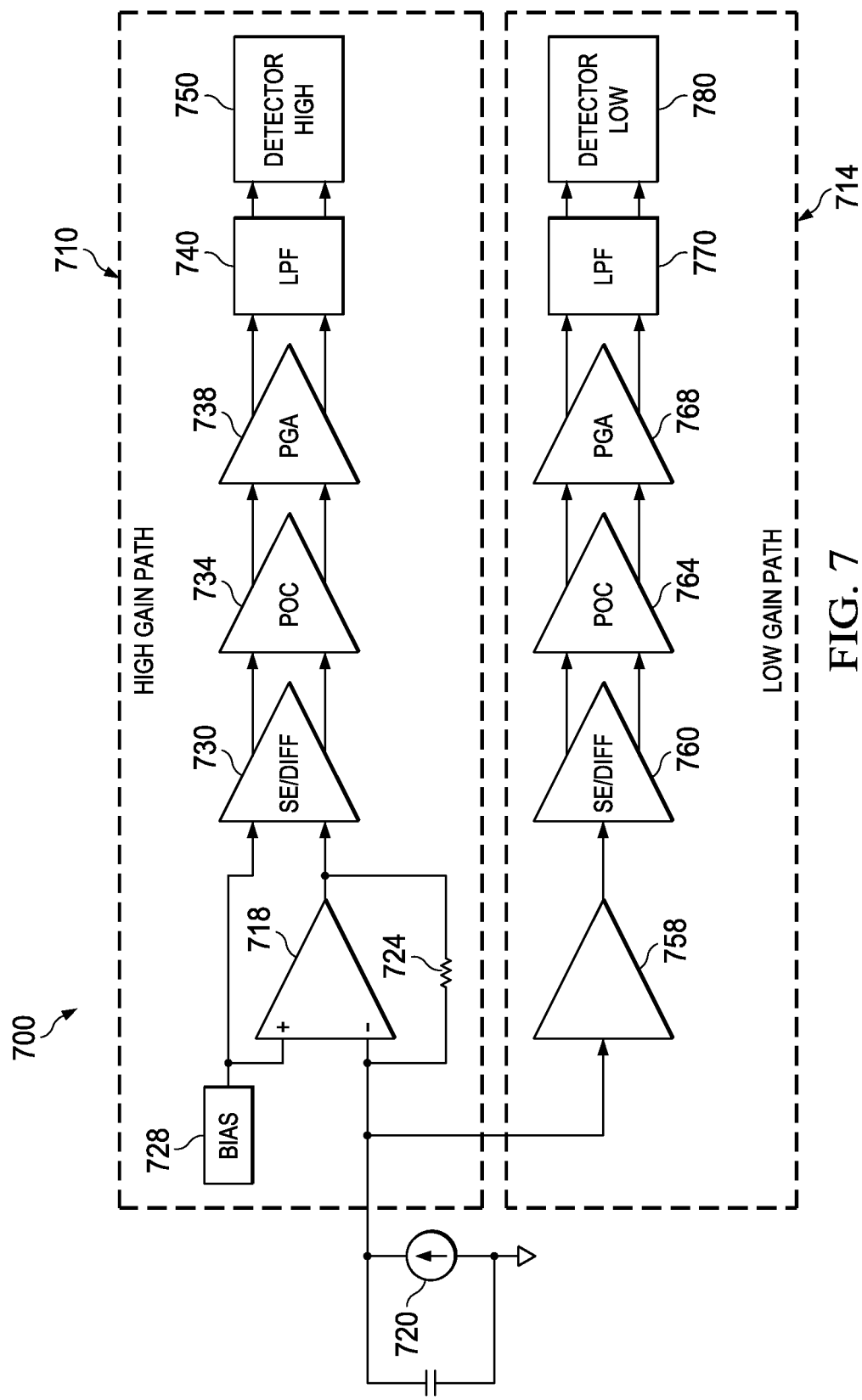
FIG. 7 illustrates an example amplifier circuit that employs programmable gains in a high gain path and a low gain path for a tunneling current sensor.

FIG. 7 illustrates an example amplifier circuit 700 that employs programmable gains in a high gain path 710 and a low gain path 714 for a tunneling current sensor. Current input is received at a negative input of transimpedance amplifier (TIA) 718 via current source 720 which represents output from a tunneling current sensor. Resistor 724 sets the saturation threshold for TIA 718 which also receives a bias voltage 728 at its positive input. Output from the TIA 718 drives a single ended to differential converter (SE/DIFF) 730 which also receives bias voltage 728. Output from the SE/DIFF 730 drives a programmable offset cancel (POC) 734 which in turn drives programmable gain amplifier (PGA) 738. Output from PGA 738 drives a low pass filter 740 which supplies detector 750 on the high gain path 710. Detector 750 can include an analog output circuit, a digital threshold detector, and an analog to digital converter (ADC), for example. It is noted that the example shown for the circuit 700 can include various combinations. For instance, multiple blocks can be combined such as combining the POC 734 and PGA 738, for example. Other blocks may not be configured in some examples.

The low gain path 714 can be configured similar to the high gain path 710. Overflow current input is received at transimpedance amplifier (TIA) 758 via current source 720. Output from the TIA 758 drives a single ended to differential converter (SE/DIFF) 760. Output from the SE/DIFF 760 drives a programmable offset cancel (POC) 764 which in turn drives programmable gain amplifier (PGA) 768. Output from PGA 738 drives a low pass filter 770 which supplies detector 780 on the low gain path 714. Detector 780 can also include an analog output circuit, a digital threshold detector, and an analog to digital converter (ADC), for example. As noted above with respect to the high gain path 710, examples path combinations shown for the circuit 700 can include various combinations. For instance, multiple blocks can be combined such as combining the SE/DIFF 760 and the POC 764, for example. Other blocks may not be configured in some examples. Digital output from each detector 750 and 780 can be provided to a controller (not shown) to control the fly height of a head based on the current received from the tunneling current sensor 720.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit comprising:
    an input that receives a current that increases as a tunneling current sensor moves closer to a media;
    a high gain path operatively coupled to the input to amplify the received current as a first amplified output, wherein the first amplified output increases until a saturation threshold is attained for the high gain path, wherein further increases in the received current beyond the saturation threshold are diverted from the input as an overflow current; and
    a low gain path operatively coupled to the input to amplify the overflow current as a second amplified output, wherein the second amplified output increases with the overflow current as the tunneling current sensor continues to move closer to the media.

2. The circuit of claim 1, further comprising a combiner to combine the first amplified output and the second amplified output into a control signal employed to control a fly height of a disk head to the media.

3. The circuit of claim 2, wherein the combiner is a summing circuit that sums the first amplified output and the second amplified output into the control signal employed to control the fly height of the disk head to the media.

4. The circuit of claim 1, further comprising a controller that receives the first amplified output and the second amplified output to generate the control signal to control the fly height of the disk head to the media.

5. The circuit of claim 1, wherein the high gain path includes a first transimpedance amplifier (TIA) to generate the first amplified output on the high gain path, wherein the saturation threshold is set via a feedback resistor from the output to the input of the TIA.

6. The circuit of claim 5, wherein the overflow current in the low gain path is amplified via a first transistor operatively coupled to the input of the TIA.

7. The circuit of claim 6, wherein the overflow current in the low gain path is mirrored via a second transistor coupled to the first transistor to generate the second amplified output from the second transistor.

8. The circuit of claim 7, further comprising a voltage reference in the low gain path to set the overflow threshold for the low gain path via the first and second transistor.

9. The circuit of claim 5, further comprising an attenuator at the output of the first TIA to limit the output voltage of the first TIA.

10. The circuit of claim 5, further comprising a second TIA in the low gain path to convert a current in the low gain path into a voltage as the second amplified output.

11. The circuit of claim 10, wherein the output of the first TIA is supplied to a subtractor in the low gain path and drives an antilog amplifier in the high gain path to generate the first amplified output.

12. The circuit of claim 11, wherein the subtractor subtracts a log scale factor from the output of the first TIA and drives a second antilog amplifier in the low gain path to generate the second amplified output.

13. The circuit of claim 5, wherein at least one of the high gain path and the low gain path include at least one of a programmable offset cancel circuit, a programmable gain amplifier, and a low pass filter to generate the first and second amplified output.

14. A circuit comprising:
    an input that receives a current that increases as a tunneling current sensor approaches a media;
    a first amplifier operatively coupled to the input to convert the received current as a first voltage output, wherein the first voltage output increases with increases in the received current until a saturation threshold is attained for the first amplifier, wherein further increases in the received current beyond the saturation threshold are diverted from the input as an overflow current;
    a second amplifier operatively coupled to the input to convert the overflow current as a second voltage output if an overthrow threshold for the second amplifier is attained, wherein the second voltage output increases with increases in the overflow current as the tunneling current sensor continues to approach the media; and
    a combiner to merge the first voltage output of the first amplifier and the second voltage output of the second amplifier into a control voltage that is employed to control the fly height of a disk head that reads or writes to the media.

15. The circuit of claim 14, wherein the combiner is a summing circuit that sums the first amplified output and the second amplified output into the control signal employed to control the fly height of the disk head to the media.

16. The circuit of claim 14, further comprising a controller that receives the first amplified output and the second amplified output to generate the control signal to control the fly height of the disk head to the media.

17. The circuit of claim 14, wherein at least one of the first amplifier and the second amplifier is operatively coupled to at least one of a programmable offset cancel circuit, a programmable gain amplifier, and a low pass filter to generate the first and second amplified output.

18. A circuit comprising:
an input that receives a current that increases as a tunneling current sensor approaches a media;
a high gain path operatively coupled to the input to convert the received current as a first voltage output, wherein the first voltage output increases with increases in the received current until a saturation threshold is attained for the high gain path, wherein further increases in the received current beyond the saturation threshold are diverted from the input as an overflow current;
a low gain path operatively coupled to the input to convert the overflow current as a second voltage output if an overthrow threshold for the low gain path is attained, wherein the second voltage output increases with increases in the overflow current as the tunneling current sensor continues to approach the media;
a combiner to merge the first voltage output of the high gain path and the second voltage output of the low gain path into a control voltage that is employed to control the fly height of a disk head that reads or writes to the media; and
a controller that receives the control voltage from the combiner to control the fly height of a head that reads or writes to the media.

19. The circuit of claim 18, wherein the high gain path includes a first transimpedance amplifier (TIA) to generate the first amplified output, wherein the saturation threshold is set via a feedback resistor from the output to the input of the TIA.

20. The circuit of claim 18, wherein at least one of the high gain path and the low gain path include at least one of a programmable offset cancel circuit, a programmable gain amplifier, and a low pass filter to generate the first and second amplified output.

\* \* \* \* \*